United States Patent [19]

Grivas

[11] Patent Number: 4,926,581
[45] Date of Patent: May 22, 1990

[54] ANIMAL TRAP

[76] Inventor: August Grivas, 3215 Avenue L, Brooklyn, N.Y. 11210

[21] Appl. No.: 375,897

[22] Filed: Jul. 6, 1989

[51] Int. Cl.$^5$ .......................................... A01M 23/08
[52] U.S. Cl. ........................................ 43/61; 43/62; 43/63
[58] Field of Search .................... 43/61, 60, 62, 58, 63

[56] References Cited

U.S. PATENT DOCUMENTS

| | | | |
|---|---|---|---|
| 472,687 | 4/1892 | Winkler | 43/61 |
| 1,480,075 | 10/1922 | Jacobi | 43/61 |
| 1,501,213 | 2/1923 | Garrison | 43/61 |
| 2,587,748 | 9/1946 | Merkl | 43/61 |
| 4,103,448 | 8/1978 | Souza | 43/58 |
| 4,569,149 | 2/1986 | Sensing | 43/58 |
| 4,578,892 | 4/1986 | Melton | 43/58 |
| 4,682,440 | 7/1987 | Hunter | 43/61 |
| 4,763,439 | 8/1988 | Smith | 43/61 |
| 4,766,692 | 8/1988 | Shurden | 43/61 |
| 4,769,942 | 9/1988 | Copenhaver | 43/58 |

Primary Examiner—Nicholas P. Godici
Assistant Examiner—Michael Starkweather
Attorney, Agent, or Firm—Robert L. Stone

[57] ABSTRACT

A T-shaped animal trap having entry ports and sliding doors at opposite ends of its head portion and a platform resting on a dowel in its leg portion. A magnet is on each end of the dowel outside of the trap which can magnetically hold to each magnet a flexible metal wire when the entry ports are open, which wire extends into the head portion and is attached to one sliding door. When the platform is moved over the dowel, the dowel partially rotates and the wires are released from the magnets, thereby permitting the sliding doors to close the entry ports. Alternatively, the animal trap may be tunned shaped with entry ports and sliding doors at opposite ends and a platform resting on a dowel near the middle of the tunnel.

14 Claims, 7 Drawing Sheets

ANIMAL TRAP

FIELD OF INVENTION

This invention relates to an animal trap which is particularly effective for trapping mice and is readily adaptable to trap larger rodents as well as being adaptable to trap birds. More particularly it relates to a trap typically in the form of the letter "T" in which a plurality of animals, such as rodents, can enter and be safely trapped by closing of portals effected with a trigger mechanism including a magnet.

BACKGROUND OF THE INVENTION AND DESCRIPTION OF THE PRIOR ART

Since rodents and particularly mice tend to move adjacent to or in proximity to the baseboards or bases of walls and are attracted to tunnel shaped entrances, such as the proverbial "mousehole", a trap which can be readily paced in juxtaposition to a wall or baseboard with tunnel-type portals permitting access to a plurality of rodents is highly desirable.

Tunnel shaped traps have been proposed in the past, for instance in U.S. Pat. Nos. 2,573,228 to Slauth; 4,103,448 to Souza; and 4,554,758 to Molloy.

Slauth's cylindrical tunnel trap is a baitless animal and rodent trap having an opening at one end with closure means; and a closed perforated closure at the other. A bent rod is associated with a coil spring and the open end is closed by its closure when the animal or rodent engages a panel which pushes the rod.

Souza's tunnel animal trap is adapted to trap a plurality of animals while automatically resetting itself. It has a single entrance and when an animal passes over a tilted floor it is trapped in a container section as the tilted floor returns to its original position to permit trapping another animal.

Molloy's tunnel trap also lures animals which hide in tunnels or other hollow areas. When the animal is in the housing of the trap and mounts a switch, electricity is supplied leading a door to close preventing escape of the animal.

In Pairo U.S. Pat. No. 1,850,634, a trap in the shape of a "T" is described. However, the rats trapped therein do not enter into a portion of the trap which can be placed in juxtaposition to a wall. Rather, the rats enter into the leg portion in which the bait is placed on a treadle which when tripped causes a latch to be pulled downward through rods and leads to disengagement of a bolt from a lug and moves a bar and a closure to close the front end of the trap. As the rats pass over the treadle they enter into the head of the T wherein they are retained without access to the leg portion while the downward movement of the treadle resets the trap.

Other devices adapted for trapping a plurality of animals are described in U.S. Pat. Nos. 1,524,692 to Dick and 2,524,423 to Buford.

Dick describes an animal trap of wire mesh with a top having a cross shape when open, a bottom and multiple entrances permitting entry of many animals. The entrances are closed by closures including a frame carrying wire mesh and hinged to the top. The closure is effected by means of a trigger arm and trip arm.

In an embodiment of Buford's disclosure a plurality of animals, particularly small ones such as rodents, enter an enclosure at any of three entrances and travel toward the bait in a small enclosure. When an animal moves into a fourth passage it is prevented from leaving by passing over a tiltable floor which causes a mechanism to close with the animal trapped in a secondary closure. The tiltable floor returns to its original position to permit trapping another animal which walks into it.

Rodent traps which are rather complex in structure and operation have also been suggested, for instance in U.S. Pat. Nos. 2,574,780 to Giacoletto and 4,418,493 to Jordan.

Giacoletto describes a tower trap with multiple means for catching rodents. The trapping technique is effected when a rodent reaches for bait and moves a bait arm, ultimately causing a gate to close.

Jordan describes a modular trap which is versatile for catching small or large animals including a capture module which provides bagging means. Animals may enter the trap through entry ports, which due to the modular shape of the trap are perpendicular to a wall when the trap lies against the wall. There is no provision for closing the entry ports.

Some traps are specifically designed against the safety of trapped animals, for instance those described in U.S. Pat. Nos. 2,962,836 to Hughes and 4,787,170 to Kingsbury et al.

In Hughes' trap captured rodents or large insects are retained on an adhesive sheet after they enter a hood structure through an opening. There is no provision for closing the openings but the adhesively trapped animals are not able to roam.

In the trap of Kingbury et al. a rodent is attracted by a bait scent to push open a door which pivots closed behind it. The trap has a low oxygen content and orifices in the door are too small to admit enough air to keep the rodent alive.

SUMMARY DESCRIPTION OF THE INVENTION

It is an object of this invention to provide an animal trap having a tunnel or head section and which is typically in the shape of a "T".

It is a further object of the invention to provide a flat T-shaped trap wherein both ends of the head of the T have tunnel type ports through which rodents may enter and wherein the trapping mechanism is triggered from the leg of the T, thereby (a) permitting the trap to be placed on a flat surface such as a floor; (b) permitting the head of the T to be placed in juxtaposition to a wall; and (c) providing ample time for a plurality of rodents, such as mice, to enter the trap before the trap is closed.

It is a further object of the invention to provide a T-shaped rodent trap wherein the mechanism which triggers closing of the trap is held firmly in place by magnets prior to triggering of the mechanism.

It is a further object of the invention to provide a trap which is simple in structure, safe to operate and traps rodents safely and painlessly so that disposition of them can be made without first subjecting them to cruelty.

Other objects of the invention will be apparent from consideration of the following description and accompanying drawings.

In accordance with certain of its aspects this invention relates to a T-shaped rodent trap adapted to be placed flat on a surface wherein the head of the T is adapted to be placed in juxtaposition to a wall with the leg of said T perpendicular to the wall, said rodent trap comprising:

entry ports at opposite ends of said head of the T and a sliding door above each of said entry ports when the ports are open, each of said sliding doors being positioned to slide down inside of said entry ports;

in said leg portion of the T at least one open screened window, a platform near said open screened window, said platform attached on a dowel above the bottom of said trap in a manner such that a weight, such as that of a rodent mounting said platform rotates or tilts it over said dowel, thereby partially rotating said dowel; and a trigger mechanism wherein said dowel upon which said platform rests traverses the width of said leg portion of said T and passes through holes in the sides of said leg portion sized to permit rotation of said dowel, a magnet on each end of said dowel and two flexible metal wires, each one extending from attachment to one of said sliding doors to reach one of said magnets when each sliding door is above each of said entry ports whereby, when said platform and dowel tilt, said wires are thereby released from said magnets allowing said doors to slide downward simultaneously closing said entry ports.

In an alternative aspect of this invention, only the aforesaid head portion of the trap is present and the leg portion is not; so that the trap is a tunnel trap comprising:

entry ports at opposite ends to the tunnel and a sliding door above each of said entry ports when the ports are open, each of said sliding doors being positioned to slide down inside of said entry ports;

a platform near the middle of said tunnel, said platform attached on a dowel above the bottom of said trap in a manner such that a weight, such as that of a rodent mounting said platform rotates or tilts it over said dowel, thereby partially rotating said dowel; and a trigger mechanism wherein said dowel upon which said platform rests traverses the width of said tunnel and one end thereof passes through a hole in a side of said tunnel sized to permit rotation of said dowel, a magnet on the end of said dowel outside of the tunnel and two flexible metal wires, each one extending from attachment to one of said sliding doors to reach said magnet when each door is above each of said entry ports whereby, when said platform and dowel tilt, said wires are thereby released from said magnets allowing said doors to slide downward simultaneously closing said entry ports.

DETAILED DESCRIPTION

Referring to the drawings wherein like numerals have the same designations, it is seen that the basic housing, indicated generally as 1, of the rodent trap is shaped as a "T" comprising a head portion 2, depicted for convenience in juxtaposition to a wall 1a, and a leg portion 3. The height of the walls of the trap are conveniently about 3–4 inches and about ¼ inch thick, particularly if the intent is to trap mice. If larger rodents are sought for trapping, the walls may of course be higher and thicker, say to about 5 to 8 inches and about ¼ to ½ inch wide. When mice are to be trapped, the head portion 2 and the leg portion 3 are each typically about 6–12 inches long and about about 3–4 inches wide in the head portion 2 and about 3–6 inches wide in the leg portion 3. Larger dimensions such as about 14–16 inches length of the head and leg portion and widths of about 10–12 inches are appropriate for trapping larger rodents. Housing 1 may be constructed of any convenient material and may be as light as pine wood or even balsa wood when mice only are to be trapped. Alternatively, the housing 1 may be a rigid plastic such as that available under the name "Lucite". When larger rodents are sought more substantial material would be appropriate; for instance, galvanized aluminum sheeting or steel when squarrels or rats are to be trapped. Galvanized aluminum is a desirable, economical material for use in accordance with this invention.

The head portion 2 essentially corresponds to a tunnel having entry ports 4 at its opposite ends. These entry ports 4 are typically rectangular in shape and extend to about half the height of walls. There are parallel tracks 5 inside the trap and adjacent to and above entry ports 4, approximately to the full height of the trap. A door 6 rests in each of the parallel tracks 5 above the entry ports 4 when the trap is open and in directly in back of them when the trap is closed. The doors may be made of the same material as the housing 1 or they may be somewhat heavier. For instance, if the housing 1 is made of pine or balsa wood the doors 6 may be made of plywood.

At the outer end of the leg portion 3 there is at least one and preferably two open screened window 7 for air access near a platform 8 and bait station 9. The bait station may simply be or contain a bait food such as cheese or peanut butter attractive to rodents or it may be a lure which they cannot actually obtain. Two open windows 7, each covered by a mesh screen 10 to prevent entrance or exit by a rodent are depicted in order to optimize the aroma or scent of bait to attract rodents toward the trap. The platform 8 desirably extends most of the width of the leg portion 3, typically leaving about 0.25–0.5 inch clearance on each side and rests on a cylindrically shaped dowel 11 which traverses the width of the leg portion 3 and extends through the sides thereof at point 12 to end just outside of the each side about 0.25–0.75 inches above the bottom of the trap. Platform 8 rests upon the dowel 11 in such a manner that when a rodent mounts it in order to approach bait station 9, the platform tips over dowel 11 thereby rotating it partially.

The housing 1 also has a roof 13 which may be made of a clear rigid plastic such as that available under the trademark "Lucite", in order to permit each observing into the trap. It is also desirable that a floor 14 be present so that the trap may be lifted when removing the rodents therefrom.

A magnet 15 is adhered to to each of the outer ends of dowel 11, just beyond each point 12. For convenience, a magnetic strip available from Jobmaster, Corp. of Randallstown, Maryland, a distributor of 3M, Corp., under the name "Plastiform" may rest in a slit in the dowel or be placed over it. Alternatively, round magnets may be used. Each door 6 has constructed therein an assembly which desirably contains a metal washer 16 directly against the each door 6, typically in the center thereof, a rubber washer 17, resting on the metal washer 16 and a screw 18 which passes through each of rubber washer 17 and metal washer 16 and into door 6. The screw 18 may be made of wood or metal. A looped end 19 of a flexible metal wire 20, made of magnetic material, such as iron or steel is looped around each screw 18. It is noteworthy that the assembly adds to the weight of the door.

The trigger mechanism of the trap is particularly constructed of the flexible metal wires 20, the dowel 11 and magnets 15. Each flexible wire exits from housing 1 through a narrow slit 21 therein near each door 6 in the side of the head portion 2 nearest leg portion 3, which narrow slit 21 can extend approximately the height of the upper half of the walls. Optionally, a flexible metal such as galvanized aluminum (not shown) may be attached to the surfaces of each of the narrow slits to make the movement of the wires in the narrow slits smoother and easier. The flexible wire can be kept close to the outside of the walls without impeding its movement by having it pass first through loose fitting semi-circular attachments 22 to the housing 1 near each slit 21 and then through similar loose fitting semi-circular attachments 22a at the start of the leg portion 3. Loose fitting semicircular attachments 22 and 22a may be appropriately shaped staples or "clou-type" nails or the like. The flexible metal wires 20 ultimately reach magnets 15 to which each magnetically adheres when the doors 6 are in raised positions and entry ports 4 are open. The ends of the flexible metal wires 20 are typically covered with rubber 23 as a protection to the handler. A hollow sleeve (not shown in FIGS. 1-4, 8 and 10) may be present on each wire which sleeve can be slid along each wire, thereby modifying the effort required to trigger the mechanism. When platform 8 is moved over the dowel 11, typically by the weight of a rodent, the dowel 11 partially rotates, thereby releasing the flexible metal wires 20 from the magnets 15, thus triggering the trap and causing doors 6 to quickly descend along parallel tracks 5 to close entry ports 4.

Figure 1:
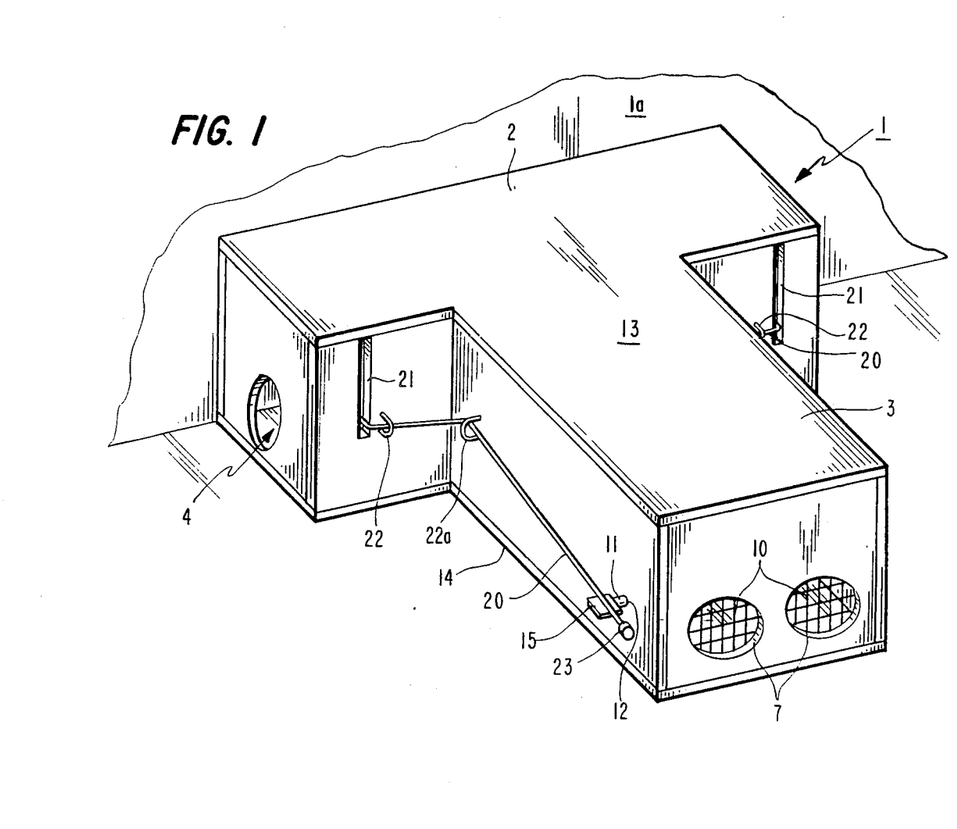
FIG. 1 is a perspective view of the T-trap with metal wires in contact with the magnets.
Figure 2:
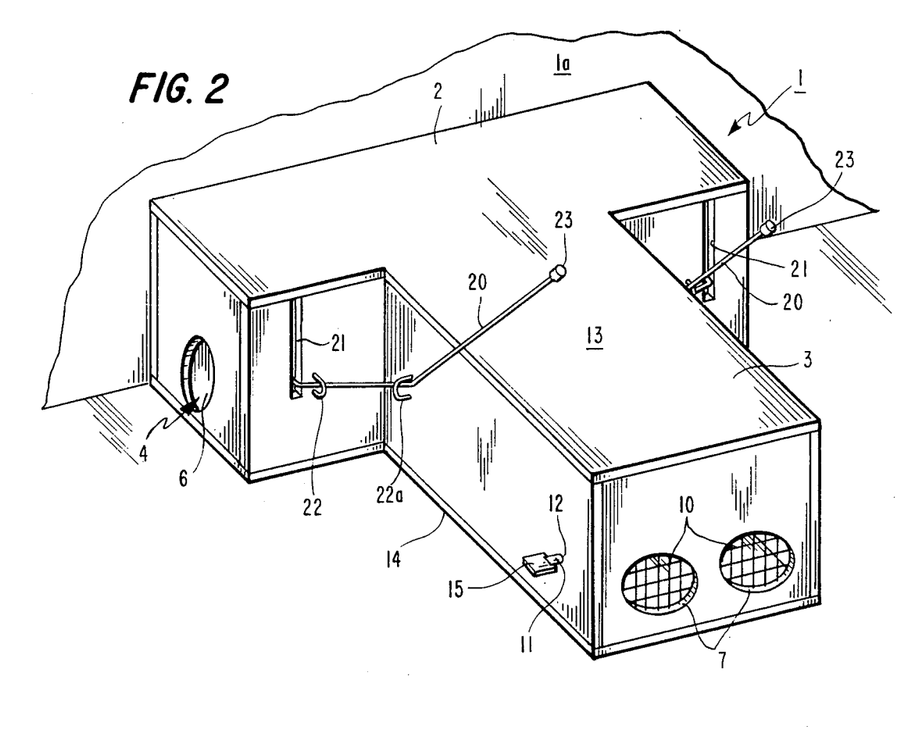
FIG. 2 is a perspective view of the T-trap with metal wires away from the magnets.
Figure 3:
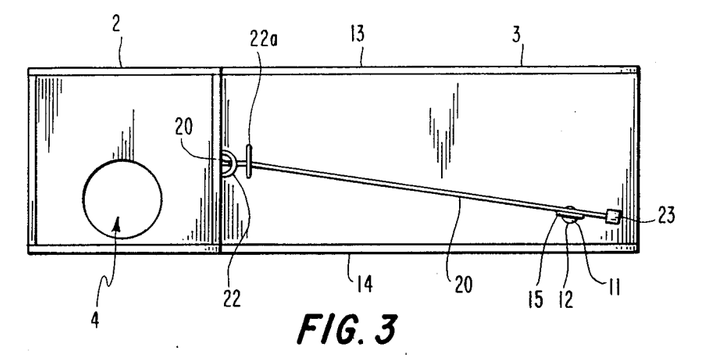
FIG. 3 is a side end view of the head portion of the T-trap with open entry port.
Figure 4:
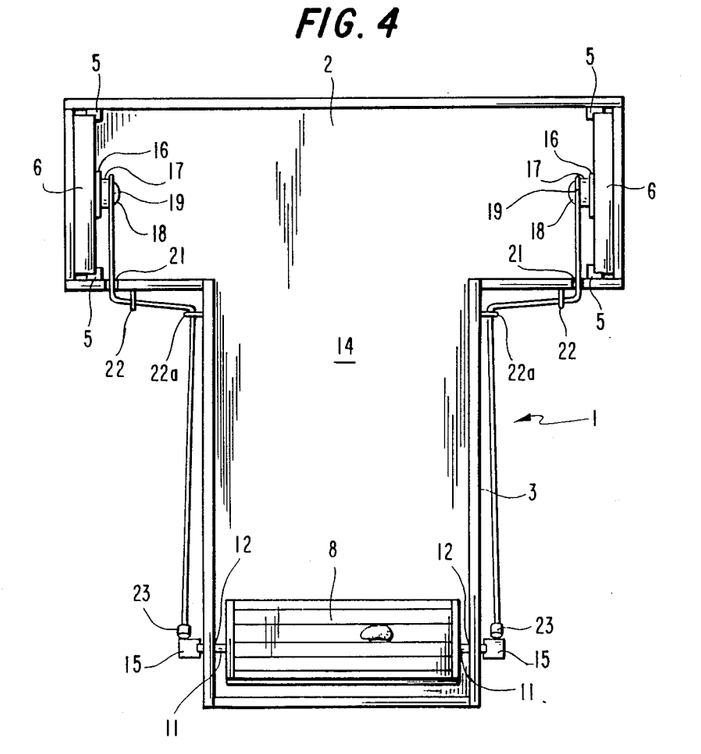
FIG. 4 is a top elevation view of the inside of the T-trap with metal wires in contact with the magnets.
Figure 5:
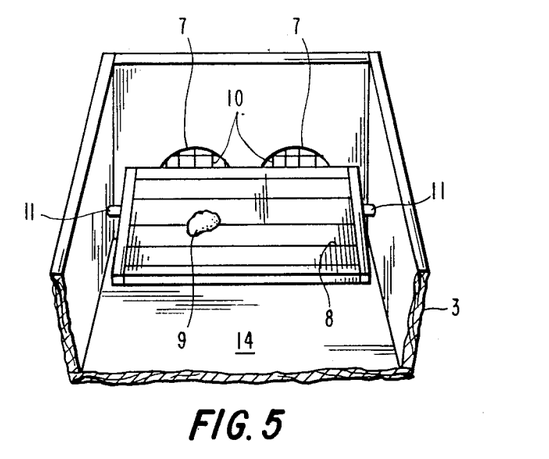
FIG. 5 is a top perspective view of the inside of the leg portion of the T-trap particularly showing the platform.
Figure 6:
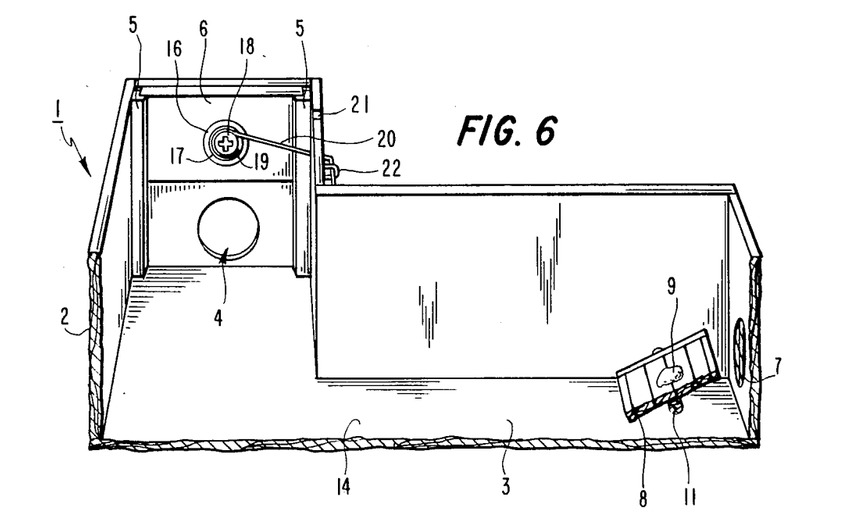
FIG. 6 is a side interior view of the T-trap particularly showing an open entry port and sliding door.
Figure 7:
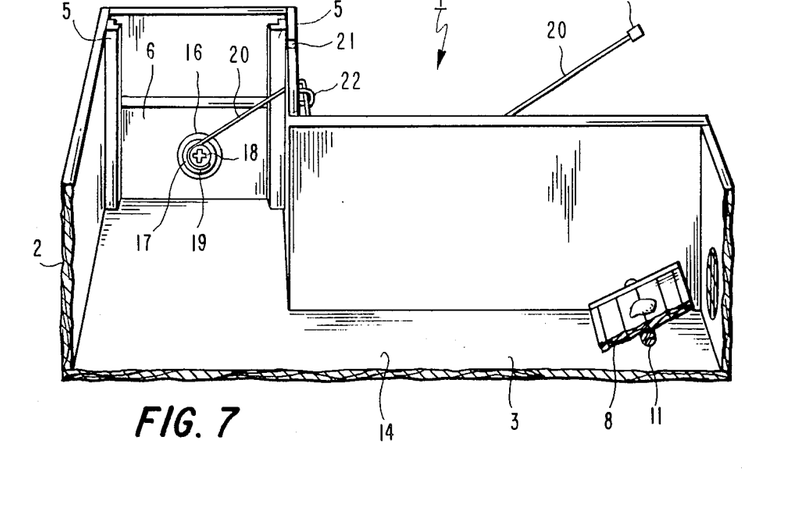
FIG. 7 is a side interior view of the T-trap particularly showing the sliding door in lowered position.
Figure 8:
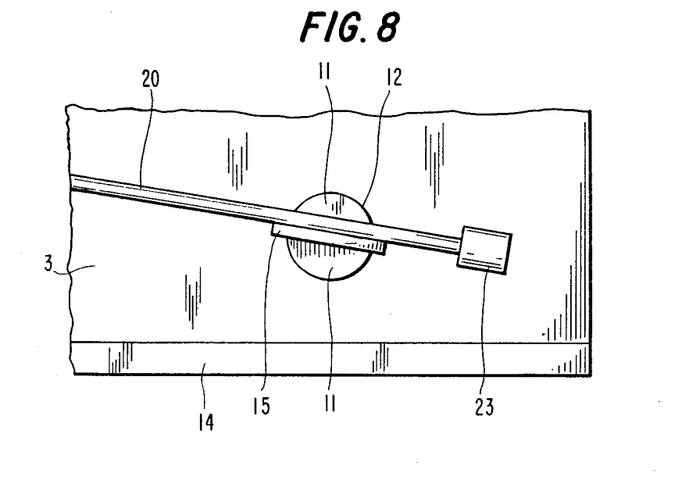
FIG. 8 is a side view of a portion of the leg of the T-trap particularly showing a magnet with adhered metal wire.
Figure 9:
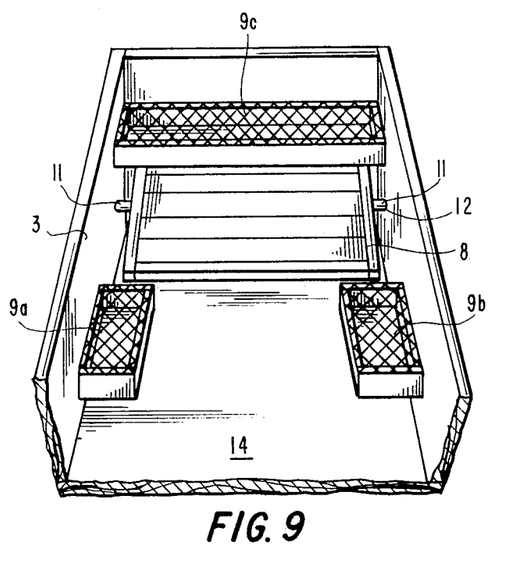
FIG. 9 is a top perspective view of the inside of the leg portion of the T-trap showing an alternative baiting means.

In the alternative depicted in FIG. 9, a plurality of bait stations 9a, 9b and 9c are positioned near platform 8, 9a being adjacent on one side, 9b being above on the other side and 9c being above and behind. These bait stations 9a, 9b and 9c can be lures of plastic bags perforated with a scent or wire mesh enclosing a food attractive to rodents or birds. The presence of a plurality of bait stations 9a, 9b and 9c increases the likelihood of several rodents or birds entering into the trap and particularly into the leg portion 3 thereof; to approach the bait and ultimately to tip platform 8 over dowel 11. Moreover, since bait stations 9a, 9b and 9c do not rest on platform 8 and since, even if they contain food enclosed in wire mesh, the bait cannot be reached by the rodents or birds it is not necessary to reset bait after each operation of the trap.

Figure 10:
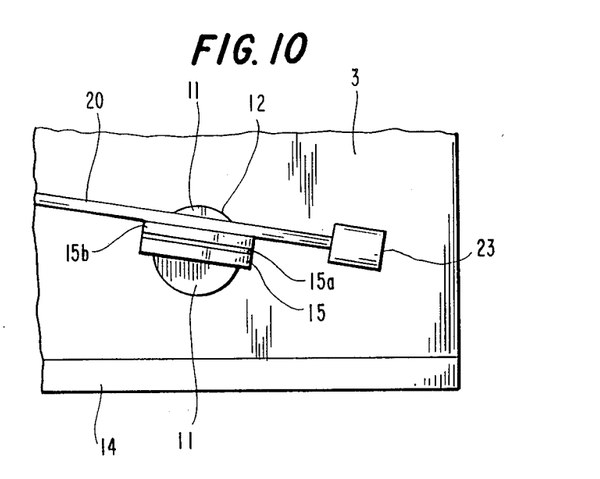
FIG. 10 is a side elevational view showing an alternative magnet assembly.

In the alternative depicted in FIG. 10, magnet tape 15a is placed on magnet 15 and an additional magnet 15b is adhered to magnet tape 15a at the end of dowel 11. This adjustment permits increasing the magnetic strength so that very light weight on the platform will not cause the dowel to rotate sufficiently to trigger the trap. This is helpful when there is heavy rodent infestation and it is desired to delay triggering the trap too soon before a substantial number of rodents enter.

When the infestation is not heavy the single magnet structure is generally sufficient. For instance when common house mice are sought to be trapped, the size of the trap and the positioning of the platform 8 in leg portion 3, well away from entry ports 3, convieniently permits trapping up to about 4 to 6 or more mice when the trap is triggered. Moreover, even the single magnet structure sufficiently strongly holds the flexible metal wire 20 so that small vibrations such as can commonly occur due to walking nearby, touching or even light tapping on the wires and the like, which could prematurely trigger other traps, are not likely to trigger the T-trap described herein. Furthermore, the magnet holds even in extreme weather conditions such as at freezing temperatures and in heavy rains.

In the operation of the T-trap, as generally indicated above, the T-trap is typically placed with the head portion in juxtaposition to a wall, particularly for trapping rodents such as mice which tend to stay near walls and are attracted to small entry ports. The rodents are also attracted to the trap by the scent of the bait, leading them to enter the trap at the entry ports in the head portion. Since the bait station or stations and the platform and dowel are in the leg portion, well away from the entry ports, there is generally ample time for several rodents to enter the trap and roam therein; in fact, some may even leave and possibly re-enter. When a rodent finally mounts the platform to approach the bait, the movement of the platform over the dowel partially rotates the dowel causing the flexible metal wires to be released from magnetic attachment to the magnets positioned on the ends of the dowel. The flexible metal wires are quickly propelled upward thereby causing the sliding doors to the which the other ends of the flexible metal wires are attached to immediately descend along the parallel tracks on the inside of the entry ports to thereby prevent the rodents inside the T-trap from escaping.

After trapping, the rodents may later be removed from the trap, for instance by lifting and tilting the trap, lowering one of the flexible metal wires by hand to raise one of the doors on its parallel track thus opening one entry port, through which the rodents may be easily slid into a receiving bag.

The floor of the T-trap can be modified by attaching saddle side tracks to its outside so that the trap can be conveniently attached to drain pipes in order to attract and trap roof rats. When it is desired to trap birds, a hook may be affixed to the roof so that the T-trap can be hung from a tree limb.

Figure 11:
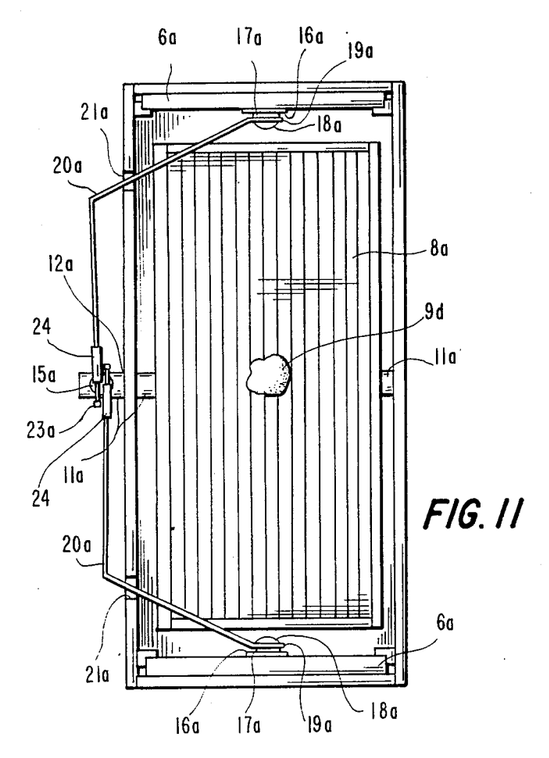
FIGS. 11 and 12 are perspective and top elevation views respectively of the tunnel trap with metal wires in contact with the magnets.
Figure 12:
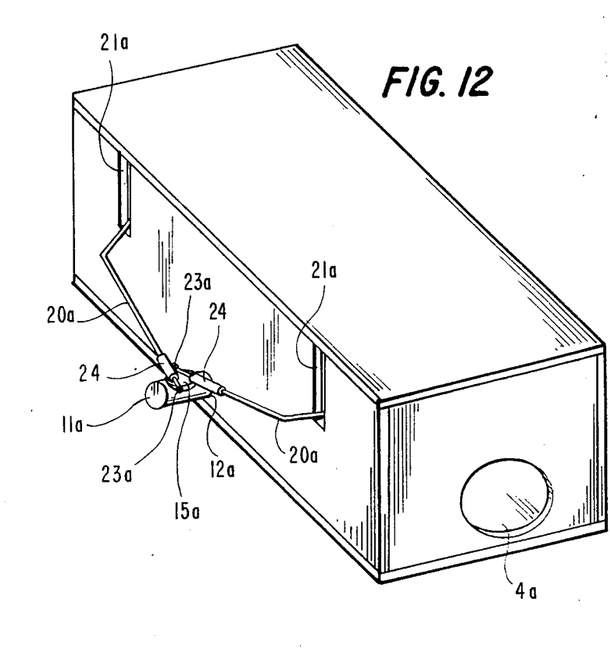

In the embodiment of FIGS. 11 and 12, the leg portion is absent, the trap is tunnel shaped 2a and essentially corresponds to head portion 2 of the T-trap and platform 8a is located near the middle of the tunnel. Entry ports 4a, sliding doors 6a, platform 8a, bait station 9d, dowel 11a, single point 12a, single magnet 15c, metal washer 16a, rubber washer 17a, screw 18a, looped wire end 19a, flexible wire 20a, narrow slits 21a and rubber covering 23a essentially correspond to 4, 6, 8, 9, 11, 12, 15, 16, 17, 18, 19, 20, 21 and 23 depicted in the views of the T-shaped trap. As shown, magnet 15a is round and rests on or in dowel 11a. Furthermore, a hollow sleeve 24 is present on each flexible wire 20a. By sliding each hollow sleeve toward or away from each rubber end, the length of wire in direct contact with the magnet is diminished or increased, thereby reducing or increasing the effort required to trigger the mechanism. The sleeves are typically about ¾ inch in length, while the rubber coverings near the tips of the wires are typically about 1/16 inch in length.

In the embodiment of FIGS. 11 and 12 semicircular attachments to keep the flexible wires close to the walls are not required. The wires are typically bent in acute angles substantially as shown.

Except for differences indicated, materials and dimensions are generally the same in the T-trap and tunnel trap aspects of the invention.

The present invention has been described above by description and illustration of particular structural features and operation. It is understood that it is not so limited but that modifications may be made within the scope of the invention.

I claim:

1. A T-shaped animal trap comprising:
   in the head portion of the T,
   entry ports at opposite ends thereof, and
   a sliding door above each of said entry ports when said entry ports are open, each of said sliding doors being positioned to slide down inside of each of said entry ports;
   in the leg portion of the T,
   at least one open screened window,
   a platform near said open screened window, said platform attached on a dowel above the bottom of said trap, said platform being tilted with said dowel when weight from an animal moves thereon; and
   a trigger mechanism, wherein
   said dowel traverses the width of said leg portion and passes through holes in the sides of said portion sized to permit rotation of said dowel,
   a magnet on each end of said dowel, and
   two flexible metal wires, each one extending from attachment to one of said sliding doors to reach one of said magnets when each of said sliding doors is above each of said entry ports whereby, when said platform and dowel tilt, said wires are thereby released from said magnets allowing said doors to slide downward simultaneously closing said entry ports.

2. The T-shaped animal trap claimed in claim 1 wherein the height of said sides is about 3–4 inches, said head portion is about 6–12 inches long and about 3–4 inches wide and said leg portion is about 6–12 inches long and about 3–6 inches wide.

3. The T-shaped animal trap claimed in claim 1 wherein said sides are essentially composed of galvanized aluminum.

4. The T-shaped animal trap claimed in claim 1 wherein two open screened windows are present in said leg portion.

5. The T-shaped animal trap claimed in claim 1 wherein there is about 0.25–0.5 inch clearance on each side of said platform to the sides of said leg portion.

6. The T-shaped animal trap claimed in claim 1 wherein each of said flexible metal wires is attached to one of said sliding doors by a screw and each of said flexible metal wires exits from said head portion through narrow slits near each door in the upper half of the side of said head portion nearest said leg portion.

7. The T-shaped animal trap claimed in claim 1 wherein bait is positioned directly on said platform.

8. The T-shaped animal trap claimed in claim 1 wherein a plurality of bait stations are positioned near said platform.

9. The T-shaped animal trap claimed in claim 1 wherein each magnet is a strip magnet.

10. The T-shaped animal trap claimed in claim 1 wherein an additional magnet is adhered to each of said magnets.

11. A tunnel shaped animal trap comprising:
    entry ports at opposite ends of the tunnel, and
    a sliding door above each of said entry ports when the ports are open, each of said sliding doors being positioned to slide down inside of said entry ports;
    a platform near the middle of said tunnel, said platform attached on a dowel above the bottom of said trap, said platform being tilted with said dowel when weight from an animal moves thereon; and
    a trigger mechanism, wherein
    said dowel traverse the width of said tunnel and one end thereof passes through a hole in the side of said tunnel sized to permit rotation of said dowel,
    a magnet on the end of said dowel outside of the tunnel, and
    two flexible metal wires, each one extending from attachment to one of said sliding doors to reach said magnet when each sliding door is above each of said entry ports whereby, when said platform and dowel tilt, said wires are thereby released from said magnets allowing said doors to slide downward simultaneously closing said entry ports.

12. A tunnel shaped animal trap claimed in claim 11 wherein said magnet is round.

13. A tunnel shaped animal trap claimed in claim 11 wherein hollow rubber coverings are present near the end of each flexible wire which can reach said magnet when each sliding door is above each of said entry ports.

14. A tunnel shaped animal trap claimed in claim 11 wherein a sleeve is present on each flexible wire which can be slid along said flexible wire.

* * * * *